US012409348B2

(12) United States Patent
Staton

(10) Patent No.: US 12,409,348 B2
(45) Date of Patent: Sep. 9, 2025

(54) DEMOLITION RAM FOR GLAZING

(71) Applicant: Larry David Staton, Allen Park, MI (US)

(72) Inventor: Larry David Staton, Allen Park, MI (US)

( * ) Notice: Subject to any disclaimer, the term of this patent is extended or adjusted under 35 U.S.C. 154(b) by 0 days.

(21) Appl. No.: 16/974,276

(22) Filed: Dec. 14, 2020

(65) Prior Publication Data

US 2022/0184426 A1 Jun. 16, 2022

(51) Int. Cl.

*A62B 3/00* (2006.01)
*A47L 13/254* (2006.01)
*B25B 33/00* (2006.01)

(52) U.S. Cl.

CPC ............ *A62B 3/005* (2013.01); *A47L 13/254* (2013.01); *B25B 33/00* (2013.01); *B25D 2250/271* (2013.01)

(58) Field of Classification Search

CPC . A62B 3/005; A47L 13/254–257; E01H 5/02; E04D 13/106; B25B 33/00; Y10T 29/53909; Y10T 29/53943
USPC ............ 225/93, 103; 254/1, 104, 19, 21, 25; 81/3.07, 488; 173/90; 29/278, 283.5
See application file for complete search history.

(56) References Cited

U.S. PATENT DOCUMENTS 302,832 A * 7/1884 Ferguson .................. A47L 1/06 15/245
348,268 A * 8/1886 Coursen .................. E04F 21/06 294/3.5
641,925 A * 1/1900 Blundell .................. A01B 1/08 172/611
832,036 A * 10/1906 Bunker .................. E04F 21/06 294/3.5
1,107,976 A * 8/1914 McCoy .................. B29C 33/00 425/469
1,371,988 A * 3/1921 Toof ...................... A47L 13/255 15/229.7

(Continued)

FOREIGN PATENT DOCUMENTS

DE 202012010886 U1 * 1/2013 ........... B30B 9/3042

OTHER PUBLICATIONS

Homedepot • (https://www.homedepot.com/p/ZipWall-ZP4-Contains-4-10-ft-Steel-Spring-Loaded-Poles-4-Heads-4-Plates-4-Tethers-4-Grip-Disks-2-Zippers-and-1-Carry-Bag-182643/202564462#overlay) (Year: 2011).*

(Continued)

*Primary Examiner* — Tom Rodgers
(74) *Attorney, Agent, or Firm* — Andrew C. Pike

(57) ABSTRACT

A demolition ram, for demolishing glazing, comprises a pusher and a handle connected at its distal end to the pusher. The pusher comprises a support plate, a rubber plating on the distal surface of the support plate, and a reinforcing flange and a boss on the proximal surface of the support plate. At least one handling aperture is through the pusher. The handle has a plate at its distal end. Fasteners removably connect the plate to the boss. A handle extension can be connected to the handle. The handle at its proximal end and the handle extension each comprises a generally textured surface. The demolishing comprises pushing a subpane out of the glazing with the demolition ram by exerting a force with the handle onto the subpane through the pusher. The subpane is then allowed to fall due to its weight, and is caught with a receptacle comprising a mat.

1 Claim, 6 Drawing Sheets

(56) References Cited

U.S. PATENT DOCUMENTS 1,482,452 A * 2/1924 Williams ................ E04F 21/06 16/422
1,515,437 A * 11/1924 Heald ..................... E04F 21/06 294/3.5
1,587,254 A * 6/1926 Taseff ..................... E04F 21/06 294/3.5
1,605,008 A * 11/1926 Smith ..................... A47L 13/24 403/66
1,662,170 A * 3/1928 Sahlstrom ............... E04F 21/06 294/51
1,674,964 A * 6/1928 Ewing ................... A47L 13/255 15/229.2
1,750,845 A * 3/1930 Lach ...................... A47K 10/00 D32/49
1,792,589 A * 2/1931 Johnson ................ A47L 13/255 15/228
1,821,875 A * 9/1931 Bochnek .................. B25G 3/36 403/243
1,922,998 A * 8/1933 Williams ................ A47L 13/52 37/241
1,930,000 A * 10/1933 Bulger ...................... E01H 5/02 294/54.5
2,234,831 A * 3/1941 Porter ..................... E02D 3/046 100/69
2,306,944 A * 12/1942 William ................ A47L 13/256 15/209.1
2,312,086 A * 2/1943 Feldman ............... A47L 13/257 15/176.3
2,639,454 A * 5/1953 Dory ......................... A47L 1/16 15/236.01
2,699,614 A * 1/1955 Welch ....................... E01H 5/10 15/236.01
2,708,764 A * 5/1955 Scott ..................... A47L 13/257 15/223
2,717,406 A * 9/1955 Herman ................ A47L 13/257 15/176.3
2,731,658 A * 1/1956 Miller ................... A47L 13/257 15/260
2,834,625 A * 5/1958 Stanley .................... B25G 1/04 403/345
2,888,701 A * 6/1959 Twerdahl .............. A47L 13/257 15/119.2
2,958,143 A * 11/1960 Bonic ....................... E01H 5/02 172/372
3,069,713 A * 12/1962 Obraske .................. E04F 21/06 15/245.1
3,153,252 A * 10/1964 Ricciardi ................. B25G 1/04 285/302
3,295,155 A * 1/1967 Belsky .................. A47L 13/254 15/228
3,338,607 A * 8/1967 Broadhurst, Jr. ......... F16B 7/10 74/544
3,388,415 A * 6/1968 Warner ................... B05C 17/00 15/210.1
3,465,377 A * 9/1969 Thomas .................. A47L 13/29 15/147.1
3,540,071 A * 11/1970 Jorgensen ................. A47L 1/06 15/105
3,604,028 A * 9/1971 Wardwell .................. B25F 1/00 7/165
3,773,375 A * 11/1973 Nehls .................... E04D 13/106 16/427
3,996,639 A * 12/1976 Griffin .................. A47L 13/255 15/229.6
4,070,128 A * 1/1978 Garrison ................. E01C 19/43 404/97
4,127,911 A * 12/1978 Cupp ....................... B25G 3/18 15/210.1
4,214,346 A * 7/1980 McDonald ............... D01B 1/08 19/60
4,245,411 A * 1/1981 McMath ................... E01H 5/02 37/285
4,253,214 A * 3/1981 Bushee ................... E04F 21/06 15/235.4
4,317,250 A * 3/1982 Shutts ....................... A47L 1/06 15/245
4,329,755 A * 5/1982 Alissandratos .......... B25G 1/04 15/160
4,375,299 A * 3/1983 Laven .................... A01D 44/00 30/317
4,467,490 A * 8/1984 Adams ...................... A47L 1/06 15/245
4,516,799 A * 5/1985 O'Donnell ................ E01H 5/02 294/54.5
4,550,943 A * 11/1985 Mirto ........................ E01H 5/02 294/50.8
4,607,872 A * 8/1986 Herner ...................... E01H 5/02 37/285
4,783,105 A * 11/1988 Schulz ...................... E01H 5/02 294/54.5
4,848,819 A * 7/1989 Moorefield ............... E01H 5/02 294/54.5
4,852,210 A * 8/1989 Krajicek ................. A47L 13/20 15/228
4,888,942 A * 12/1989 Monaco ................... A01D 7/00 56/400.01
4,947,562 A * 8/1990 Williamson .............. E01H 5/02 37/285
4,970,750 A * 11/1990 Davis ...................... A47L 13/16 15/244
5,056,245 A * 10/1991 Jenkins ..................... E01H 5/02 294/51
5,067,197 A * 11/1991 Cormier .................. A47L 13/11 37/285
5,105,493 A * 4/1992 Lugtenaar .............. A01D 11/00 7/116
5,309,654 A * 5/1994 Mathis ...................... E01H 5/02 294/51
5,346,269 A * 9/1994 Price ......................... E01H 5/02 294/54.5
D355,286 S * 2/1995 Wallace ......................... D32/49
5,410,771 A * 5/1995 Bereza ...................... A47L 1/06 15/232
5,419,015 A * 5/1995 Garcia .................... A47L 13/20 15/228
5,419,600 A * 5/1995 Tisbo ........................ E01H 5/02 37/285
5,435,610 A * 7/1995 Roberts ................... E04F 21/22 29/278
5,437,450 A * 8/1995 Akatsuka .............. B29C 70/085 473/319
5,461,749 A * 10/1995 Ahlberg ................ A47L 13/256 15/228
5,467,496 A * 11/1995 Jarvis ....................... B25G 3/08 404/97
D368,561 S * 4/1996 Hodges .......................... D32/50
5,524,369 A * 6/1996 Phillips ................. E04D 13/106 37/285
5,525,189 A * 6/1996 Villers ..................... B25G 3/26 15/245.1
D372,406 S * 8/1996 Scarvaglione ..................... D8/1
5,568,668 A * 10/1996 Margolin ............. A46B 5/0095 15/176.3
5,606,761 A * 3/1997 Lynch ...................... B25G 1/04 15/236.1
5,609,255 A * 3/1997 Nichols ................... A47L 13/20 15/228
5,787,588 A * 8/1998 Tisbo ........................ E01H 5/12 294/54.5
5,806,608 A * 9/1998 DuBois ................... B23B 45/16 173/90
5,810,333 A 9/1998 Hickerson et al.
5,885,145 A * 3/1999 O'Mara .................. B24B 7/184 403/56
5,983,455 A * 11/1999 Polzin ...................... B25G 1/04 15/144.4
6,003,915 A * 12/1999 Bierman .............. A63C 11/221 294/51

(56) References Cited

U.S. PATENT DOCUMENTS

D422,427 S * 4/2000 Packer .......................... D6/403
6,052,982 A * 4/2000 Haar ....................... A01D 7/06 56/400.21
6,397,427 B1 * 6/2002 Bryngelsson .......... B25G 1/102 15/228
6,481,040 B1 * 11/2002 McIntyre ............... A46B 13/02 15/97.1
6,526,619 B1 * 3/2003 Cassels, Jr. ......... E04D 13/0765 172/380
6,543,951 B1 * 4/2003 Bauman .................... A47L 1/15 401/265
6,558,073 B1 * 5/2003 Wrazidlo .............. E01C 19/006 404/133.05
6,709,189 B1 * 3/2004 Spooner ................... B25G 3/30 403/341
6,769,153 B1 * 8/2004 Post ......................... A47L 1/15 15/232
6,944,980 B1 * 9/2005 Lefrancois ................ E01H 5/02 37/285
6,990,705 B1 * 1/2006 Schouten ................ A47L 13/11 15/105
7,134,244 B2 11/2006 Diamond
7,156,435 B1 * 1/2007 Mourelatos ............... E01H 5/02 294/54.5
D539,496 S * 3/2007 Sickler ............................ D8/10
7,740,416 B2 * 6/2010 Lesche .................... E01C 19/35 404/133.05
7,887,092 B1 * 2/2011 Pacheco ................. A62B 3/005 280/727
D636,236 S * 4/2011 Telford, Jr. ........................ D8/1
D637,404 S * 5/2011 Wang ............................ D4/137
8,096,368 B1 * 1/2012 Rider .................... E04H 17/263 173/90
8,166,597 B2 * 5/2012 Levitt ..................... A47L 13/12 15/228
8,277,144 B1 * 10/2012 Bayley .................... E01C 19/44 15/235.4
8,464,387 B1 * 6/2013 Cohen ..................... A47L 13/12 15/105
8,522,649 B2 * 9/2013 Yousufzai ............. E04D 15/003 30/169
D694,484 S * 11/2013 Angel ............................ D32/51
8,701,238 B1 * 4/2014 Morad .................. A47L 13/255 15/228
8,756,741 B2 * 6/2014 Cohen ..................... A47L 13/12 15/105
D716,122 S * 10/2014 Bingham ......................... D8/45
D724,910 S * 3/2015 Davis ............................... D8/10
8,973,201 B1 * 3/2015 De Vito ............... A46B 5/0054 D4/130
9,032,584 B1 * 5/2015 McAvoy ............... A47L 13/256 15/228
9,765,534 B1 * 9/2017 DiLuzio ................ E04F 21/241
D824,128 S * 7/2018 O'Shea .......................... D32/46
10,052,009 B1 * 8/2018 Morad ..................... B25G 3/36
D866,896 S * 11/2019 Gee, II ........................... D32/46
10,744,635 B1 * 8/2020 Stratton ................... B25G 1/04
10,794,060 B1 * 10/2020 Ramsey .................. B08B 1/005
10,927,511 B2 * 2/2021 Dellario .................. E01C 19/32
11,066,831 B2 * 7/2021 Ramsey ................ E04D 13/106
2002/0155220 A1 * 10/2002 Ray ......................... B44C 3/046 427/256
2003/0009839 A1 * 1/2003 Streutker ................ A47L 13/42 15/228
2003/0136029 A1 * 7/2003 Nieckula ............... E04D 13/106 37/265
2003/0204926 A1 * 11/2003 Jurgens .................... B25G 3/30 15/144.3
2004/0108121 A1 * 6/2004 Lowther .................. B21D 1/06 173/90
2004/0244117 A1 * 12/2004 Huang ................... A01B 1/227 7/114
2005/0017223 A1 * 1/2005 Lucas ..................... B66F 13/00 254/1
2005/0025580 A1 * 2/2005 Wheeler ................... E02D 3/02 405/271
2005/0144816 A1 * 7/2005 Payton ...................... E01H 5/02 37/285
2005/0152737 A1 * 7/2005 Tien ........................ A47L 13/22 401/270
2005/0155171 A1 * 7/2005 Boyer ................... A47L 13/146 15/119.2
2005/0229438 A1 * 10/2005 Douziech .................. E01H 5/02 37/285
2005/0278887 A1 * 12/2005 Kraft, III ................ A47L 13/52 15/257.1
2005/0279520 A1 * 12/2005 Newman ............... B25B 13/481 174/544
2006/0097530 A1 * 5/2006 Marquardt ............... A01B 1/22 294/57
2006/0288537 A1 * 12/2006 Francisco ................ B25G 1/04 16/429
2007/0089255 A1 * 4/2007 Michelson .............. A47L 13/12 15/144.3
2007/0226935 A1 * 10/2007 Lu .......................... B05C 17/00 15/210.1
2008/0030036 A1 * 2/2008 Shuler ....................... E01H 5/02 294/54.5
2008/0066253 A1 * 3/2008 Stevens ............. A46B 11/0093 15/248.1
2009/0214295 A1 * 8/2009 Lesche .................... E01C 19/32 404/133.05
2010/0205758 A1 * 8/2010 Levitt ..................... A47L 13/12 15/228
2011/0013982 A1 * 1/2011 Prohaska ................ E02D 3/046 404/72
2011/0020051 A1 * 1/2011 Robertson ............. A47L 13/254 401/268
2011/0094047 A1 * 4/2011 Gold .................... A46B 5/0008 15/207.2
2011/0126490 A1 * 6/2011 De Leon ................. B65B 67/12 53/390
2011/0209298 A1 * 9/2011 Weaver ................. A47L 13/144 15/119.1
2011/0219962 A1 * 9/2011 Ivkovic ................. B30B 9/3053 100/265
2011/0258889 A1 * 10/2011 Settembre ................. E01H 5/02 37/278
2012/0023696 A1 * 2/2012 Huang .................. A47L 13/256 15/231
2012/0167320 A1 * 7/2012 Weaver ................... A47L 13/20 15/119.1
2013/0000064 A1 * 1/2013 Katou ...................... B25G 1/04 15/209.1
2014/0007906 A1 * 1/2014 Bates ...................... A47L 13/24 134/6
2014/0137338 A1 * 5/2014 Meinzer ................... B25H 3/02 81/488
2014/0215739 A1 * 8/2014 Lindner ................ A47L 13/256 15/147.1
2014/0338141 A1 * 11/2014 Morancey ................ B25G 3/36 15/231
2015/0074927 A1 * 3/2015 Widmer ................ A47L 13/254 15/147.2
2015/0089757 A1 * 4/2015 Davidshofer ......... A47L 13/254 15/147.2
2015/0314143 A1 * 11/2015 McCann .................. B25D 7/00 7/138
2015/0315756 A1 * 11/2015 Glosser ..................... E01H 5/02 37/197
2016/0144833 A1 * 5/2016 Cohen ..................... A47L 13/12 15/105
2016/0157595 A1 * 6/2016 Rajaiah .................... A61K 8/02 15/104.94
2016/0356009 A1 * 12/2016 Pieper-Bailey .......... A01B 1/04
2017/0057066 A1 * 3/2017 Senegal ................... B25G 1/04
2017/0113340 A1 * 4/2017 Tomasovich ........... A46B 5/026
2017/0143179 A1 * 5/2017 Taylor ................... A47L 13/256

(56) References Cited

U.S. PATENT DOCUMENTS

| | | | | |
|---|---|---|---|---|
| 2017/0225317 | A1* | 8/2017 | Cook | A47L 13/16 |
| 2017/0240143 | A1* | 8/2017 | Vaeth | B60S 3/045 |
| 2017/0260705 | A1* | 9/2017 | Katauskas | F24S 40/20 |
| 2018/0141202 | A1* | 5/2018 | Newman | B25G 3/26 |
| 2019/0193257 | A1* | 6/2019 | Monahan | B25G 3/30 |
| 2019/0200834 | A1* | 7/2019 | Olschan | B25G 1/04 |
| 2019/0390422 | A1* | 12/2019 | Tavolino | E01H 5/061 |
| 2019/0390852 | A1* | 12/2019 | Sigurdson | A47L 13/24 |
| 2020/0029776 | A1* | 1/2020 | Shintani | A47L 13/44 |
| 2020/0113402 | A1* | 4/2020 | Shintani | A47L 13/42 |
| 2021/0290028 | A1* | 9/2021 | Martinez | A47L 13/254 |

OTHER PUBLICATIONS

Homedepot • (https://www.homedepot.com/p/Asphalt-8-in-x-8-in-Welded-Steel-Head-And-Handle-Tamper-19-152/305979356) (Year: 2019).*

Build Master tools • (https://buildmastertools.com/product/dirt-tamper-plate-11-34%E2%80%B3-x-8-14%E2%80%B3-fit-jack-hammer-1-18%E2%80%B3-hitachi-mak/) (Year: 2017).*

YouTube: DIY ground tamper tool fast easy cheap; view video at (https://www.youtube.com/watch?v=IoVfgneDhu8) [online] (Year: 2020).*

YouTube: DIY/Homemade dirt, sand, and gravel tamper update; view video at (https://www.youtube.com/watch?v=ak6rLLetmL4) [online] (Year: 2018).*

Marshall Town (https://marshalltown.com/pro-2302-shock-absorbing-coated-tamper) (Year: 2019).*

The Fabricator (https://www.thefabricator.com/thefabricator/article/cadcamsoftware/the-art-of-bevel-cutting) (Year: 2014).*

Dictionary.com definition for rigidly (Year: 2022).*

YouTube video clip entitled "DIY / Homemade dirt, sand, and gravel tamper update", uploaded on Jun. 27, 2018 by user "Manny Fontes" <https://www.youtube.com/watch?v=ak6rLLetmL4> (Year: 2018).*

YouTube video clip entitled "DIY Ground Tamper Tool Fast Easy Cheap", uploaded on Jun. 13, 2020 by user "notesfromavagabond" <https://www.youtube.com/watch?v=IoVfgneDhu8> (Year: 2020).*

Translation of DE-202012010886-U1 (Year: 2013).*

W.W. Manufacturing Co., Inc. catalog, W.W. Manufacturing Company, Inc., Bridgeton, New Jersey, 6 sheets, 10 pages; dated Oct. 2021.

Accu-Tamper® / Wire Entrenching Tool / Landscape Lighting Install Tool brochure, W.W. Manufacturing Company, Inc., Bridgeton, New Jersey, 1 sheet, 2 pages; no date.

STF Spades & Shovels / Pitch, Stone/Mulch Forks / Mower Deck Grass Scrapers brochure, W.W. Manufacturing Company, Inc., Bridgeton, New Jersey, 1 sheet, 2 pages; no date.

YouTube: Accu Tamper 2015; view video at (https://www.youtube.com/watch?v=6plulWcrsjs) [online] (Year: 2015).

YouTube: How To Replace Broken Window Pane Glass—Jonny DIY; view video at (https://www.youtube.com/watch?v=SL9Om5pek1A) [online] (Year:2017).

* cited by examiner

DEMOLITION RAM FOR GLAZING

BACKGROUND OF THE INVENTION

Field of the Invention

The present invention relates to demolishing glazing, and particularly to window or panel assemblies and structures and especially large-scale glazing such as plate glass, and to safely remove the panes or subpanes from the glazing.

Background Art

The glazing industry encompasses both the installation of glazing and the demolition of glazing, both the pane or panes of the window or the panel and also the assemblies and structures thereof such as the framing. At times, undamaged glazing may be demolished to be replaced, by either new glazing or by having the opening for it in the wall for it to be closed up or sealed off.

More often, however, one or more of the panes of the glazing have been cracked, or broken or shattered into subpanes, necessitating replacement of the panes. Before replacement, the panes and subpanes must be removed from the glazing.

Typically, the material of the panes of the glazing is one or another composition of glass, although other substances are also used. The broken edge of glass is well known to be exceptionally sharp, rivaling even deliberately designed knives, razors, and scalpels. The movement of a broken glass edge can quickly slice through ordinary cloth, and especially slice through living tissue such as skin, oftentimes painlessly without being immediately noticed. When moving under force, such as gravity when falling, broken glass edge can also slice through muscle and bone, and has been known to inflict serious and even fatal injuries, for example, to internal organs.

While the glazing of windows that are of a common size for residential use presents less of a problem in removal, but by no means hazard-free even in a general sense, greater risk is involved in the removal of large-scale glazing. Large-scale glazing frequently makes use of one large single pane; but also can use multiple large panes adjacent to each other edge-to-edge, typically horizontally aligned with each other. Such a large single pane can weigh tens of pounds to hundreds of pounds (thus effectively amount by mass to tens to hundreds of kilograms), presenting a serious risk for injury upon removal. There are many different names for such large-scale glazing, and may be exemplarily referred to as plate glass, store front, or glass walls, and may be installed as an exterior glazing separating the inside from the outside or as an interior glazing subdividing in some manner an interior volume. Common installations of large-scale glazing are in office buildings, retail shops, manufacturing factories, and even in transportation such as vehicles; but can be also used in residential buildings, where they may be referred to as a picture window.

One technique for the removal of a window or panel pane or panes, or subpane or subpanes, of either undamaged or damaged glazing, and sometimes after any supporting trim, mould, seal, or caulk is removed and typically on one side only of the pane or subpane, is to merely pick up the pane or subpane out of the glazing. However, this is fraught with great and unknowable danger. In addition to the exceptionally sharp edges of the pane or subpane when broken, commonly there may be also partial cracks or microfractures within the glazing material of the pane or subpane itself; and not every such crack or microfracture can be apparent or even seen by visual inspection without specific crack/fracture detection tools. When moved, either by direct manual manipulation or by machine, the internal stresses can quickly overwhelm the structural integrity of the glazing material at such a partial crack or microfracture. The partial crack or microfracture then rapidly extends, often so quickly as to be without any warning, and the pane or subpane virtually instantly breaks or shatters. This breaking or shattering results in more subpanes with many more exceptionally sharp edges all at once. The subpanes usually fall downward, either straight down or at an angle, with any splinters exploding outwardly. Control of the handling of the original pane or subpane being removed is usually lost, and the newly broken subpanes can unexpectedly hit people, or hit hard surfaces and break or shatter into many more pieces that also have exceptionally sharp edges. This typically occurs in about one second or less. Even if the pane or subpane that was so picked up out of the glazing does not break internally in this manner, control of the handling of that pane or subpane can still be lost suddenly, resulting in either the movement of any such exceptionally sharp edge or else the falling and hitting against of that pane or subpane onto a hard surface and the subsequent breaking or shattering of that pane or subpane, or both. Ultimately, the seemingly acceptable risk, before the removal of that pane or subpane, of this technique can quickly lead to any of these subpanes, or the original pane or subpane being removed, to cut, stab, or outright kill any nearby person, especially the worker removing the pane or subpane but even a bystander.

Another technique for the removal of a pane or panes, or a subpane or subpanes, of either undamaged or damaged glazing is to simply hammer, or otherwise push, out it or them out of the glazing. However, this makes the risk of injury even greater because those working to remove that pane or subpane are adjacent, or otherwise in close proximity, to the glazing. Any moving exceptionally sharp edge of that pane or subpane or any subpane resulting in its breaking, again, can quickly lead to that worker, or any other nearby person, being injured or killed.

A safer technique is to break up piece-by-piece the pane or subpane of the glazing in location within the glazing. Two individuals, one on each side of the glazing, work from the top of the pane or subpane to be removed downward, breaking it up into generally handheld pieces. Typically, they mount ladders to reach one uppermost corner or portion of the pane or subpane to be removed. Then one of them scores the surface of that pane or subpane to define a small section that is typically no more than about half a foot (about 15 centimeters) in its largest dimension, but does not break that pane or subpane. The other one of them, on the opposite side, works the small section loose, for example with breaking pliers, against the score line, breaking the small section from the rest of that pane or subpane. The small section is then safely removed from the glazing. This procedure is repeated, piece by piece and top to bottom, until the remainder of that pane or subpane is considered to be small enough to safely remove from the glazing in one remaining piece. The risk of breaking or shattering unexpectedly and dangerously is thus greatly reduced. But this “whittling-down” process is highly time consuming and laborious. Furthermore, the remainder of that pane or subpane can still unexpectedly and suddenly move or fall out of the glazing, and any other subpane, that is on the other side of the crack or fracture of the original glazing, can also unexpectedly and suddenly move or fall out of the glazing;

and again, with persons being so close to the glazing to be demolished, serious or fatal injuries can occur.

SUMMARY OF THE INVENTION

An objective of the present invention is to reduce the risk of serious or fatal injury during the removal of a pane or subpane of glazing when the glazing is demolished.

Another objective is to more quickly demolish glazing while at the same time reducing the risk of serious or fatal injury during that demolition of the glazing.

Another objective is to distance those who are demolishing glazing from that glazing in order to reduce the risk of serious or fatal injury during that demolition of the glazing.

Another objective is to quickly assemble and disassemble a demolition ram to be used in demolishing glazing.

Another objective is to selectively modify a demolition ram to be used in demolishing glazing.

These and further objectives are met by the present invention, which is contemplated to encompass the subject matter as claimed herein, that has been described and also shown in the accompanying drawings, and the equivalents that are consonant therewith.

The present invention comprises a demolition ram. The demolition ram comprises a pusher, and a handle connected to the pusher. The pusher comprises a support plate having a proximal surface and a distal surface, and comprises a boss on the proximal surface. The handle has a proximal end and a distal end, and comprises a plate at the distal end. Fasteners, comprising fixed fasteners on the boss and removable fasteners removably mountable on the fixed fasteners, removably connect the plate to the boss. The handle has a slenderness ratio of at least twenty-five and not more than one hundred ten.

The demolition ram further comprises an end cap removably mountable on the proximal end. A handle extension is connectable to the proximal end, after removal of the end cap when the end cap is mounted on the proximal end. The proximal end and the handle extension each comprises threaded fasteners connectable together. The handle extension comprises a generally textured surface; and the proximal end comprises a generally textured surface, and the distal end comprises a generally smooth surface.

A reinforcing flange is on the proximal surface of the support plate, and a plating is on the distal surface of the support plate. The plating comprises a raised pattern, and can comprises a rubber coating or a rubber working plate. The plating is beveled, and corners of the pusher are clipped. At least one handling aperture is through the pusher.

One method of demolishing glazing, comprising at least one subpane, of the present invention comprises pushing the subpane out of the glazing with the demolition ram. The pushing comprises touching the subpane with the pusher, and exerting a force about the proximal end, and moving the subpane to a position where the subpane can fall due to the weight of the subpane. The exerting generates an impulsive force, generally coaxial with the exerting, onto the subpane through the touching to result in the moving. The method further comprises allowing the subpane to fall due to the weight of the subpane, and catching the subpane as it falls with a receptacle comprising a mat. The method further comprises assembling the pusher and the handle together with the fasteners, removing the end cap when mounted on the handle, and connecting the handle extension to the handle.

When demolishing glazing comprising at least two subpanes, the subpanes can each have an instability, respectively thereamong from least to greatest. The method then comprises pushing out of the glazing the one subpane that has the greatest instability.

BRIEF DESCRIPTION OF THE DRAWINGS

FIG. 4A is a partial view that is the cross-sectional view, taken on line 4-4 in FIG. 2, of the pusher and the distal end of the handle up to the same break line that is shown in FIG. 4B; and FIG. 4B is a partial view that is the cross-sectional view, taken on line 4-4 in FIG. 2, of the proximal end of the handle up to the same break line that is shown in FIG. 4A.

DETAILED DESCRIPTION OF THE INVENTION

Figure 1:
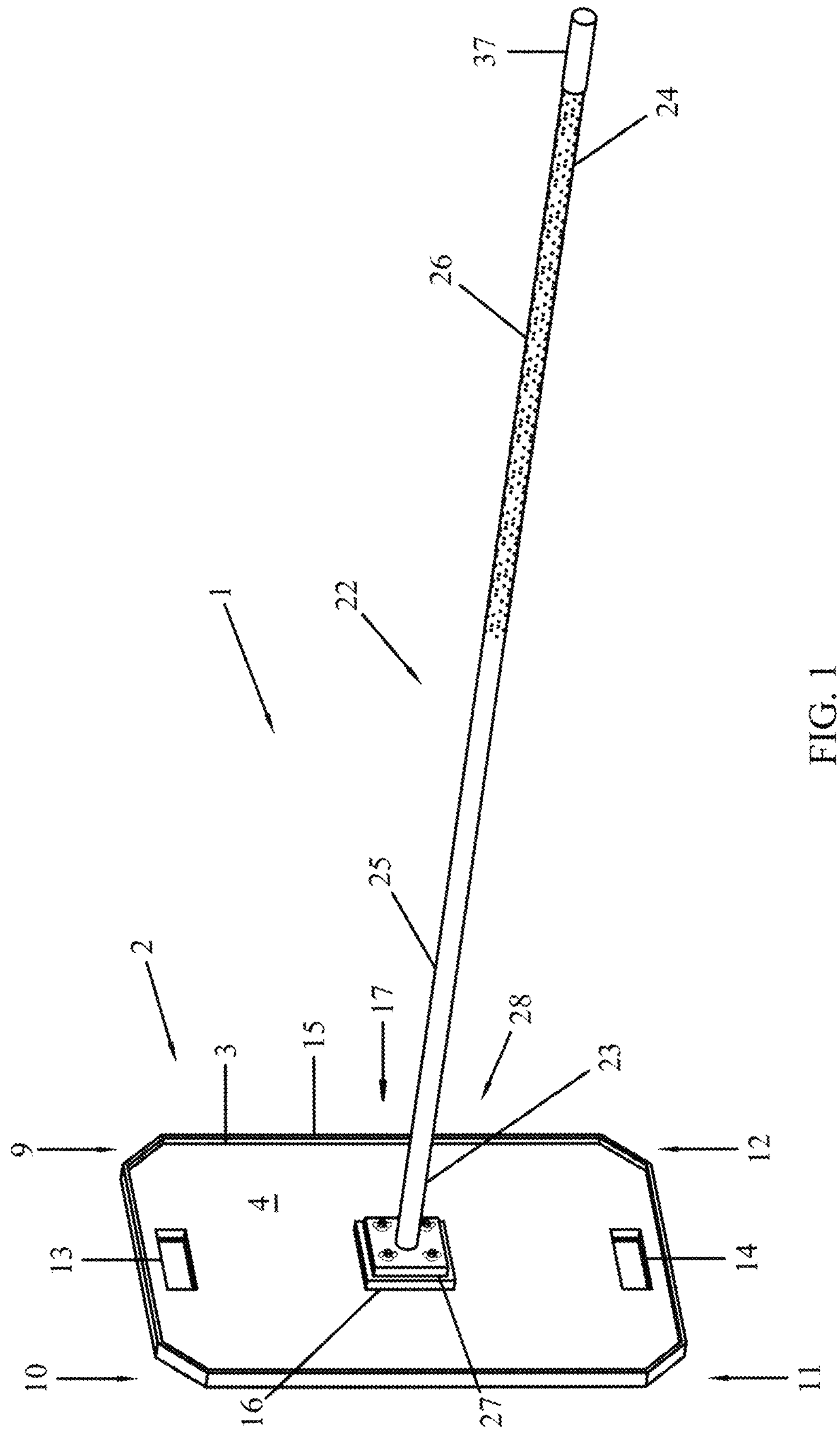
FIG. 1 is a perspective view of one embodiment of the present invention comprising a demolition ram comprising a pusher and a handle.
Figure 6:
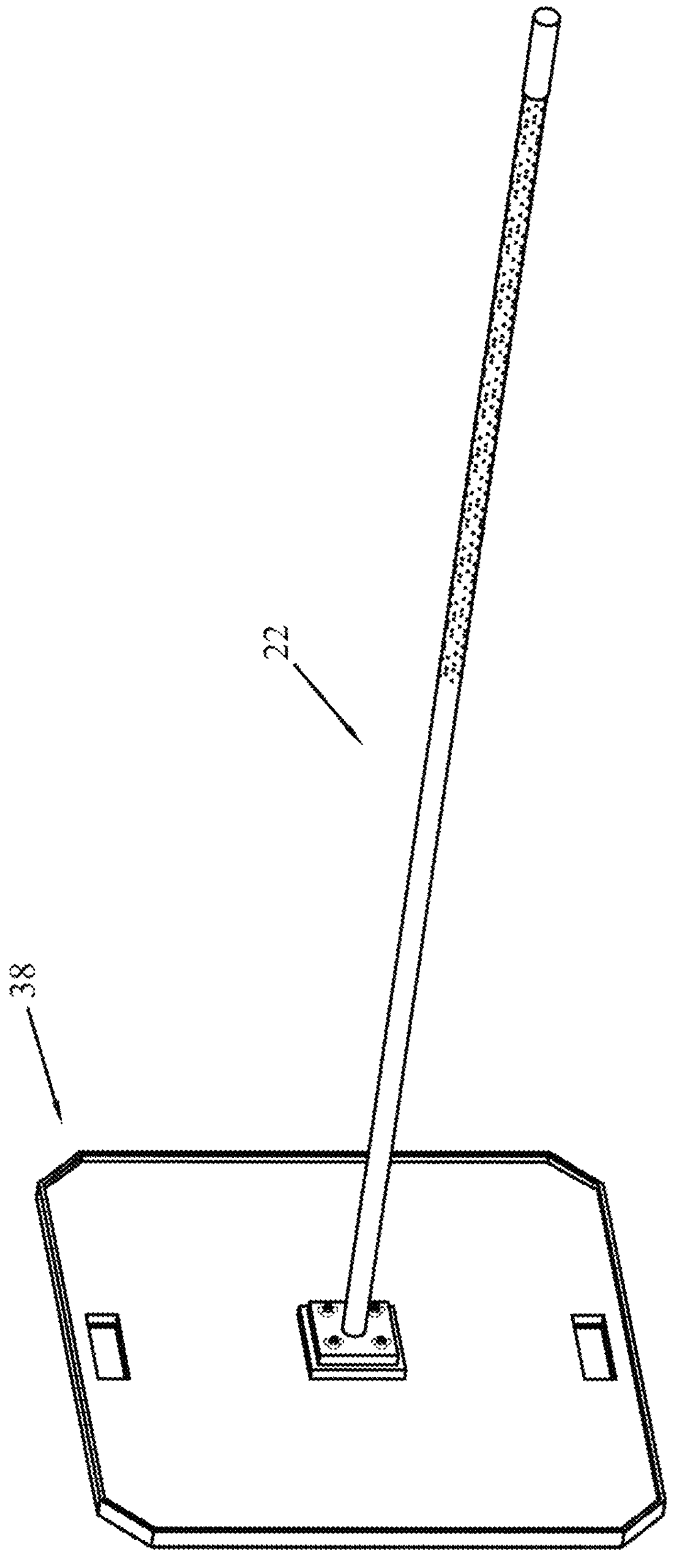
FIG. 6 is a perspective view of another embodiment of the present invention comprising a demolition ram comprising a pusher and a handle.

One embodiment of the present invention for demolishing glazing is a demolition ram 1, as shown in FIG. 1. The demolition ram 1 comprises a pusher. The pusher is generally rectangular, being a pusher 38 having sides of equal length as shown in FIG. 6 or preferably, as shown especially in FIG. 2 and FIG. 3, being a pusher 2 having sides of unequal length.

Figure 3:
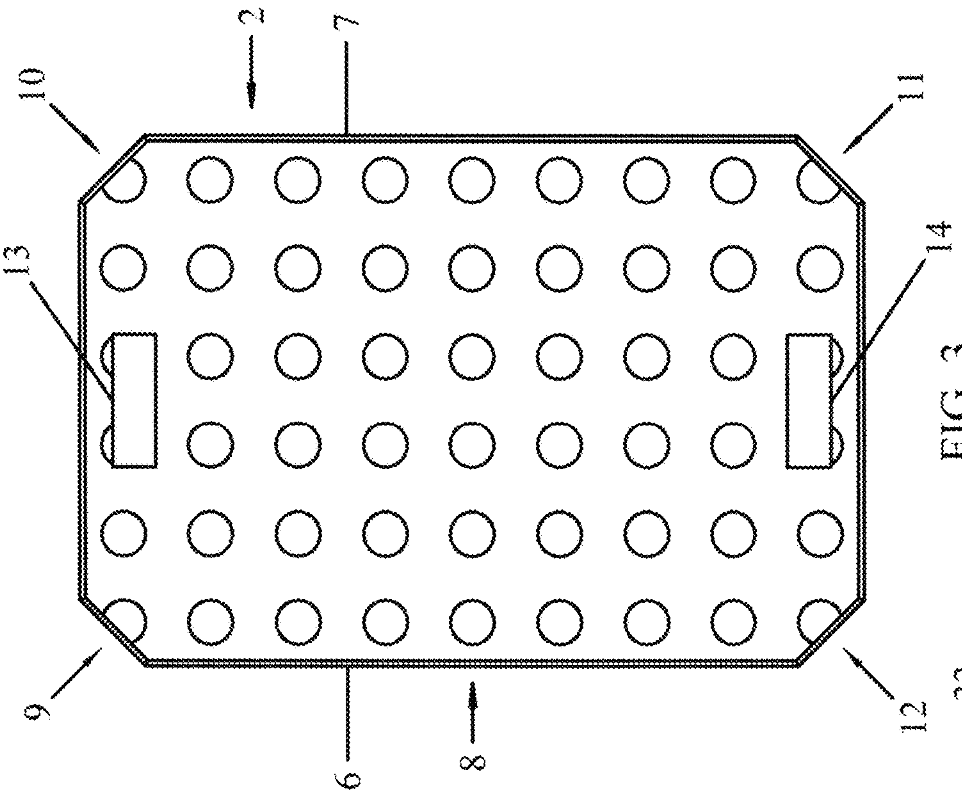
FIG. 3 is an end view of the embodiment of the present invention, as shown in FIG. 1, of the distal surface of the pusher.
Figure 2:
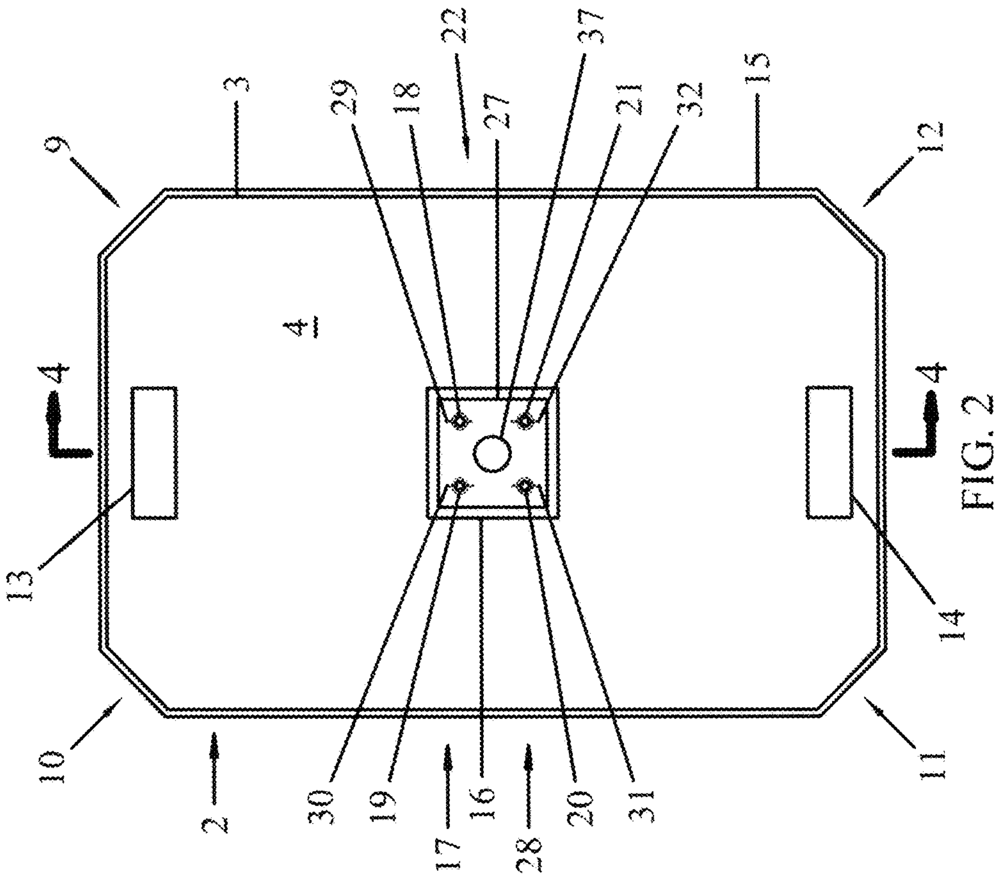
FIG. 2 is an end view of the embodiment of the present invention, as shown in FIG. 1, of the proximal end of the handle toward the proximal surface of the pusher.
Figures 4A, 4B:
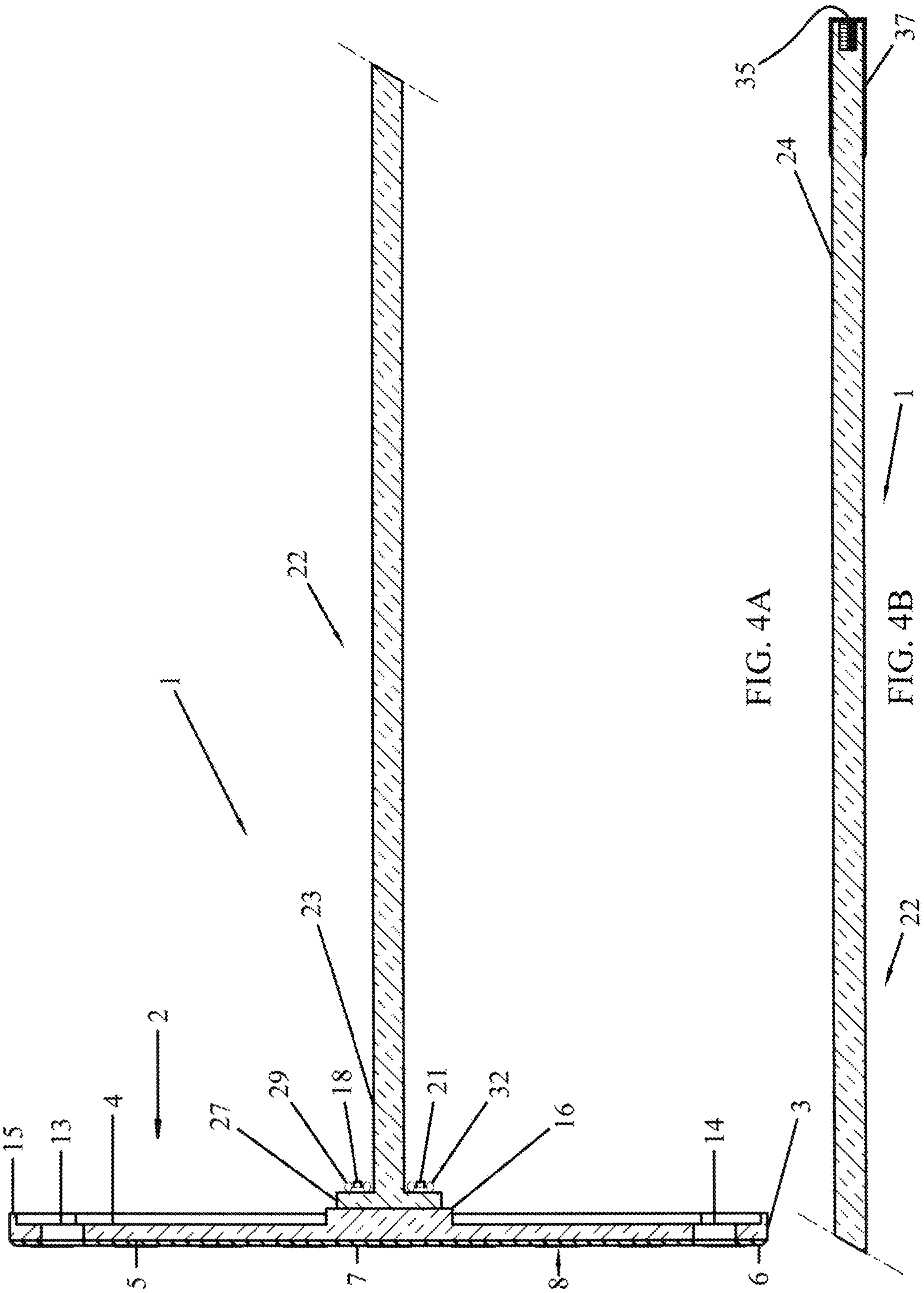
FIG. 4A and FIG. 4B together are a cross-sectional view taken on line 4-4 in FIG. 2, where.

The pusher 2 comprises a support plate 3. As shown in FIG. 1 and FIG. 2, and especially in FIG. 4A, the support plate 3 has a proximal surface 4, a distal surface 5, an outer edge defining the perimeter of the support plate 3, and a thickness defined generally between the proximal surface 4 and the distal surface 5. The thickness of the support plate 3 spaces the proximal surface 4 from the distal surface 5. The pusher 2 also comprises a nonslip plating 6 on the distal surface 5 as shown in FIG. 3 and FIG. 4A. The nonslip plating 6 preferably is a rubber coating that is glued, or otherwise adhered, to the distal surface 5. The rubber coating can, in fact, be a working plate 7, made of rubber, that is glued, adhered, or otherwise attached to the distal surface 5. The nonslip plating 6 has a raised pattern 8 on its outer surface. The raised pattern 8 preferably is an array of protrusions. The array may be orthogonally arranged as shown in FIG. 3, or (not shown) offset arranged. The protrusions may be generally equal as shown in FIG. 3 or unequal (not shown) to each other. One embodiment of the protrusions comprises circularly shaped pads as shown in FIG. 3.

Corners 9, 10, 11, and 12 of the pusher 2, and thus particularly of the support plate 3 and of the nonslip plating 6, are clipped to remove these right-angled corners, reducing the possibility of the demolition ram 1 undesirably catching on or damaging adjacent objects or injuring nearby persons. The clipped corners 9, 10, 11, and 12 of the pusher form further sides of the pusher 2, and thus the pusher 2 is more particularly octagonal. The nonslip plating 6, too, is beveled defining the perimeter of the nonslip plating 6 as shown in FIG. 3 and FIG. 4A, also reducing the possibility of the demolition ram 1 undesirably catching on or damaging adjacent objects or injuring nearby persons. The nonslip plating 6 thus is a frustum having the larger base adhered to the distal surface 5 of the support plate 3 as shown in FIG. 4A. As shown in FIG. 3 and FIG. 4A, the larger base is equal in area to the distal surface 5. Thus, the perimeter of the nonslip plating 6 is not more than the perimeter of the support plate 3, and is generally within the perimeter of the support plate 3.

Handling apertures 13 and 14 go through the support plate 3 and the nonslip plating 6 of the pusher 2. The handling apertures 13 and 14 are located generally adjacent to but spaced from the shorter sides of the pusher 2. The handling apertures 13 and 14 are for easily handling the pusher 2, such as picking it up. While two handling apertures 13 and 14 are specifically shown in FIG. 1 through FIG. 4A, the present invention is contemplated to have any number of the handling apertures through the pusher 2, from at least one to as many as four or more adjacent to any of the sides of the pusher 2.

A reinforcing flange 15 is on the proximal surface 4 of the support plate 3 and extends generally perpendicularly away from the proximal surface 4. The reinforcing flange 15 is located at the perimeter of the support plate 3, is bounded by the perimeter by not exceeding beyond the perimeter, and encompasses the entire perimeter. Alternatively, a pattern (not shown) of reinforcing flanges can be arrayed across any portion, or the entirety, of the proximal surface 4.

A boss 16 is also on the proximal surface 4 of the support plate 3 within the perimeter of the support plate 3. The boss 16 has a proximal surface, a thickness, and a perimeter. The boss 16 is centrally located on the proximal surface 4 of the support plate 3, and is generally rectangular, having sides of unequal length or preferably, as shown especially in FIG. 1 and FIG. 2, of equal length. As shown in FIG. 4A, the boss 16 is opposite of the distal surface 5 with the thickness of the support plate 3 spacing the boss 16 from the distal surface 5. The proximal surface of the boss 16 is parallel with the distal surface 5, and the thickness of the boss 16 spaces the proximal surface of the boss 16 from the proximal surface 4 of the support plate 3. As shown in FIG. 1 and FIG. 4A, the boss 16 extends generally outwardly away from the proximal surface 4 so that the thickness of the boss 16 and the thickness of the support plate 3, combined, at the boss 16 is greater than the thickness of the support plate 3 adjacent, but spaced from, the boss 16. The perimeter of the boss 16 is less than the perimeter of the support plate 3. The handling apertures 13 and 14 are between the perimeter of the support plate 3 and the perimeter of the boss 16. The reinforcing flange 15 and the boss 16 are spaced apart from each other.

A first plurality of fasteners 17, as bolts 18, 19, 20, and 21 which preferably are nonshear hardened bolts and most preferably have shear strength A325 being, for example, grade 8 bolts or grade 5 bolts, are fixed on the boss 16 of the support plate 3 of the pusher 2. The fixed fasteners 17 preferably are partially embedded within the boss 16, with at least some of their distal portions being within the boss 16 and their proximal portions extending exteriorly outwardly from the boss 16 generally in the same direction as the direction of from the distal surface 5 to the proximal surface 4 of the support plate 3.

The demolition ram 1 also comprises a handle 22. The handle 22 is an elongate, generally circularly cross-sectional shaft, as shown in FIG. 1 and FIG. 2 and also in FIGS. 4A, 4B. While the handle 22, and also the handle extension 33, is specifically shown in FIG. 1 through FIG. 5 as circularly cross-sectional, the present invention is contemplated to encompass any cross-sectional geometry of either or both the handle 22 and the handle extension 33.

The handle 22 has a generally distal portion that has a distal end 23 of the handle 22 and a generally proximal portion that has a proximal end 24 of the handle 22. The handle 22 has a longitudinal axis generally concentric with the geometric cross section of the handle 22 and extending between the distal end 23 and the proximal end 24. The longitudinal axis is generally perpendicular to the proximal surface 4 of the support plate 3. The distal portion including the distal end 23 has a generally smooth surface 25, and the proximal portion including the proximal end 24 has a generally textured surface 26. The textured surface 26 is, generally, about half of the total surface, by either length or area, of the handle 22. Alternatively, the textured surface 26 may be more or less than half of the total surface, by either length or area, of the handle 22.

Each of the fixed fasteners 17 individually is nonconcentric with and spaced from the longitudinal axis of the handle 22.

A plate 27 is at the distal end 23. The plate 27 is centrally located with respect to the cross section of the handle 22. The plate 27 is parallel with the boss 16 and parallel with the support plate 3. The geometry of the plate 27 generally corresponds with that of the boss 16, and thus preferably is also generally rectangular having sides of equal length but is slightly smaller in area than that of the boss 16 as shown in especially FIG. 2. A plurality of apertures matching the plurality of fixed fasteners 17 extend through the plate 27. The exteriorly extending proximal portions of the fixed fasteners 17 extend through the apertures in the plate 27 beyond the plate 27, in the same direction as the direction of from the distal surface 5 to the proximal surface 4 of the support plate 3.

A second plurality of fasteners 28, removable, as nuts 29, 30, 31, and 32 which preferably are wing nuts that can be tightened by hand, are removably mountable on the fixed fasteners 17 for removably and rigidly connecting the plate 27 of the handle 22 to the boss 16 on the proximal surface 4 of the support plate 3 of the pusher 2 so that the plate 27 of the handle 22 is removably on the proximal surface of the boss 16 of the support plate 3 as shown in FIG. 1, FIG. 2, and FIG. 4A. The handle 22 thus connected to the proximal surface 4 of the support plate 3 is spaced from the perimeter of the support plate 3 and is centrally located on the proximal surface 4 of the support plate 3 as shown in FIG. 1 and FIG. 2.

Figure 5:
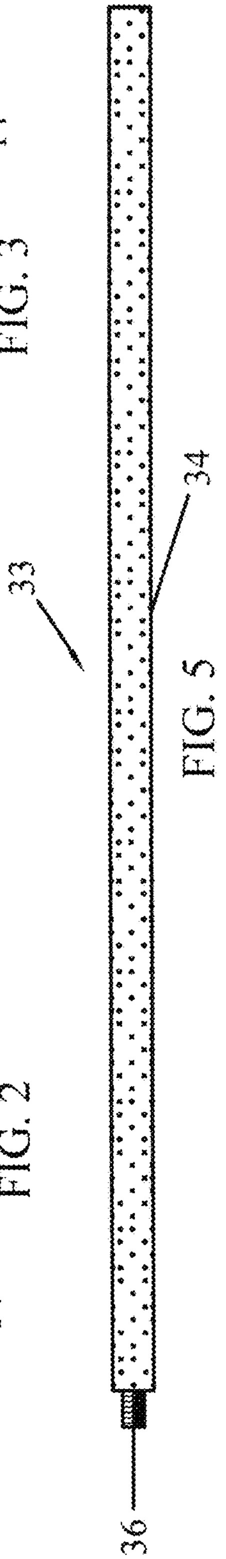
FIG. 5 is a side view, of the embodiment of the present invention as shown in FIG. 1 and FIGS. 4A and 4B, of a handle extension that is connectable to the handle.

A handle extension 33 for the demolition ram 1 is an elongate shaft, preferably generally circularly cross-sectional, as shown in FIG. 5. Preferably, the handle extension 33 matches the proximal end 24 of the handle 22. The surface of the handle extension 33, and preferably the entire circumferential surface as shown in FIG. 5, is a generally textured surface 34.

As shown in FIG. 4B, the proximal end 24 has a socket 35, as a fastener, that is threaded. A pin 36, as a fastener, is on a terminus of the handle extension 33, and is also threaded. The handle extension 33 is connectable to the proximal end 24 of the handle 22 by the socket 35 and the pin 36 being threadably connectable together.

An end cap 37 is removably mountable on the proximal end 24. The end cap 37 may be rubber or plastic. The end cap 37 is friction-fitted onto the proximal end 24, and covers the socket 35 when the handle extension 33 is not on, and not connected to the proximal end 24 of, the handle 22.

The pusher 2 and the handle 22 of the demolition ram 1, as well as the handle extension 33, may be made of any suitable material. Preferably, each of the pusher 2, the handle 22, and the handle extension 33 is made of solid fiberglass. The lineal density of the fiberglass may be about 2.2 pounds per 32 inches (about 1 kilogram per 0.8 meters). The support plate 3, the reinforcing flange 15, and the boss 16 may be unitarily formed as a single piece of fiberglass. The nonslip plating 6 is therefore adhered, or otherwise attached, to this single fiberglass piece. Likewise, the handle 22 and the plate 27 at the distal end 23 may be unitarily formed as a single piece of fiberglass. The handle extension 33, with the pin 36, may also be unitarily formed as a single fiberglass piece. The textured surface 26 of the proximal end portion of the handle 22 may be unitarily formed of the material of the handle 22. Also, the textured surface 34 of the handle extension 33 may be unitarily formed of the material of the handle extension 33. Alternatively, the pusher 2, specifically the support plate 3, could be steel and the handle 22, and also the handle extension 33, could be aluminum. Moreover, instead, the pusher 2 could be a four-foot-by-eight-foot sheet (122 by 244 centimeters) of OSB (commonly known as chipboard) or plywood, and the handle 22 could be a ten-foot length (0.3 meters) of two-by-four (5 by 10 centimeters) studding lumber.

The pusher 2, the handle 22, and the handle extension 33 of the demolition ram 1 are sized for more safely demolishing glazing. Typically, one size, a common residential glazing size, for the demolition ram 1 is for common sizes of the glazing of residential windows such as 20 by 24 inches (51 by 61 centimeters); and a different size, a large-scale glazing size, for the demolition ram 1 is for large-scale glazing as may be exemplified by plate glass such as 84 by 108 inches (213 by 274 centimeters). The common residential glazing size would typically be on the order of about 16 by 16 inches (about 40 by 40 centimeters) or about 18 by 18 inches (about 46 by 46 centimeters) for the pusher 2. The large-scale glazing size would typically be on the order of about 24 by 36 inches (about 61 by 91 centimeters), although it could be anywhere from about 22 by 30 inches (about 56 to 76 centimeters) to about 48 by 48 inches (about 122 by 122 centimeters). For both the common residential glazing size and the large-scale glazing size, typically the support plate 3 would have a thickness on the order of about three fourths of an inch (about 19 millimeters), the boss 16 also having a thickness on the order of about three fourths of an inch (about 19 millimeters) and a size on the order of about six by six inches (about 15 by 15 centimeters), and the plate 27 also having a thickness on the order of about three fourths of an inch (about 19 millimeters) but a size on the order of about five by five inches (about 13 by 13 centimeters). The reinforcing flange 15 typically would have a thickness on the order of about five sixteenths of an inch (about 8 millimeters) and a height of about one half of an inch (about 13 millimeters).

The handle 22 is sized to space far apart a worker using the demolition ram 1 to demolish glazing and the glazing itself; and preferably also sized so as to fit, either along the length or else diagonally, within a conventional pickup truck bed. Further, the handle 22, and also the handle extension 33, is sized so as to be easily grasped by hand and especially when those handling the demolition ram 1 are wearing gloves. The handle 22 for the common residential glazing size typically would be on the order of about nine feet (about 274 centimeters) in length by about four and one-half inches (about eleven and one-half centimeters) in circumference. The handle 22 for the large-scale glazing size would typically be on the order of about nine feet to ten feet (about 274 to 305 centimeters) by about four and one-half inches (about eleven and one-half centimeters) in circumference. The handle extension 33 would more likely be used for the large-scale glazing size, and would typically be on the order of about four feet to three feet (about 122 to 91 centimeters) in length by about four and one-half inches (about eleven and one-half centimeters) in circumference; thus, the connected-together handle 22 and handle extension 33 would be about thirteen feet (about 396 centimeters) in length. The end cap 37 for the proximal end 24 of the handle 22 typically would have a length on the order of about six inches (about 15 centimeters).

Thus, in sizing the handle 22 and the handle extension 33 to space far apart a worker using the demolition ram 1 to demolish glazing and the glazing itself, the handle 22 has a slenderness ratio defined as the ratio of the overall length of the handle 22 to the maximum transverse dimension, as a diameter when the cross section of the handle 22 is circular as shown, of the handle 22. Specifically, the overall length of the handle 22 is the length of the handle 22 between the terminus, where the plate 27 is, of the distal end 23 and the terminus, where the opening for the socket 35 is, of the proximal end 24. Preferably, the slenderness ratio of the handle 22 is about seventy-five; but the slenderness ratio of the handle 22 may be in the range of at least twenty-five and not more than one hundred ten. Further, the connected-together handle 22 and handle extension 33 as a unit preferably has a slenderness ratio of about one hundred eight, but may have a slenderness ratio of at least one hundred five and not more than one hundred fifteen.

The demolishing of the glazing begins first with an evaluation of the glazing. The glazing may comprise exactly one original pane, or may comprise a plurality of original panes, irrespective of the assembly or structure of the glazing, for example singular framing or multiple framing, whether external or internal, and also irrespective of the number of any layering of panes between the ultimately inner surface and the ultimately outer surface of that pane, whether that pane is exactly one original pane or one of a plurality of original panes, although such inner and outer with respect to such surfaces may not necessarily be with respect to any inside and outside.

The glazing may be essentially completely undamaged, and the glazing is to be demolished for reasons other than damage to that glazing such as replacement, by, for example, new glazing, or to have the opening for it in the wall for it to be closed up or sealed off.

Alternatively, the glazing to be demolished may be damaged, but any apparent damage, as a crack or a hole, in the material, for example glass, in the glazing does not fully divide any original pane into individual subpanes. Specifically, every original pane has its own perimeter edge, that may comprise any number of rectilinear or curved edges including exactly one edge, that define the perimeter of its pane and encompass the volume and the opposite surfaces, that are the ultimately inner surface and the ultimately outer surface, of that pane; and, furthermore, due to the necessarily three dimensionality of that pane, its perimeter edge might even be identified as an extensive surface, but is nonetheless the perimeter edge of that pane because it does encompass the volume and the opposite surfaces of that pane. Thus, damage, for example a crack, may not fully divide any original pane into individual subpanes by extending from one point on the perimeter edge of that pane to a different point on the perimeter edge, irrespective of the number of any layering of panes between the ultimately inner surface and the ultimately outer surface of that pane.

In either case, any such original pane of that glazing is its own subpane; in other words, the subpane is one hundred percent of the original pane of that glazing to be demolished, irrespective of the total number of original panes of that glazing.

However, it is more frequently the case that the demolition is the demolishing of glazing that comprises, not merely at least one subpane due to the original pane being its own subpane, but at least two subpanes due to at least one of the original panes of that glazing having at least one crack that extends from one point on the perimeter edge of that original pane to a different point on the perimeter edge of that original pane.

Furthermore, though, if there is at least one such crack that has fully divided any original pane into individual subpanes, it may be that one or more of those subpanes have already fallen or are otherwise removed from the glazing. In which case, there may be indeed at least one subpane, and perhaps only one subpane remaining, in the glazing that is less than one hundred percent of the original pane of that glazing to be demolished.

Continuing the demolition, a receptacle is located to easily and safely catch the glazing as it is being demolished. Many times, though, a common waste gondola is too tall to locate immediately in front of and below the glazing for especially large-scale glazing. Therefore, the present invention contemplates a mat for the receptacle, such as an industrial quilt or a fire blanket for example, especially in such a case.

Figure 11:
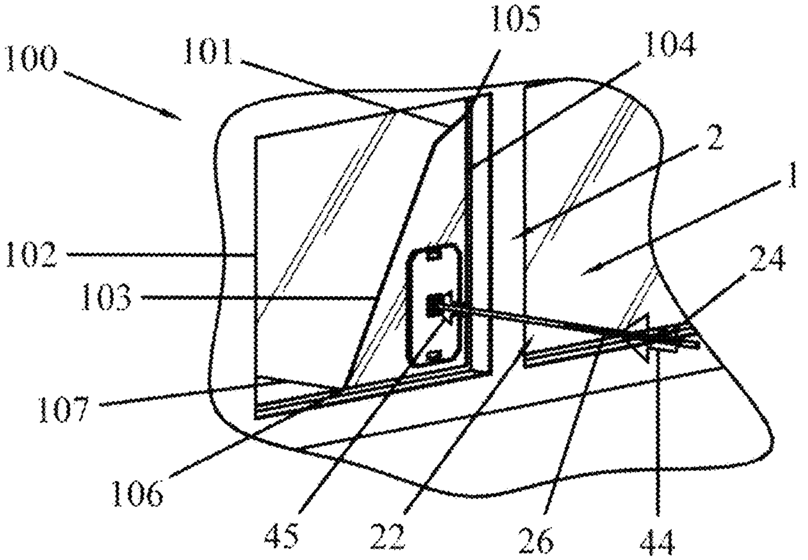
FIG. 11 is an interior perspective view, partly broken, of the demolishing of glazing in accordance with the embodiment of the present invention, as shown in FIG. 1, showing pushing of a subpane out of glazing with the demolition ram comprising touching the subpane with the pusher and exerting a force about the proximal end of the handle to generate an impulsive force onto the subpane through the touching.
Figure 12:
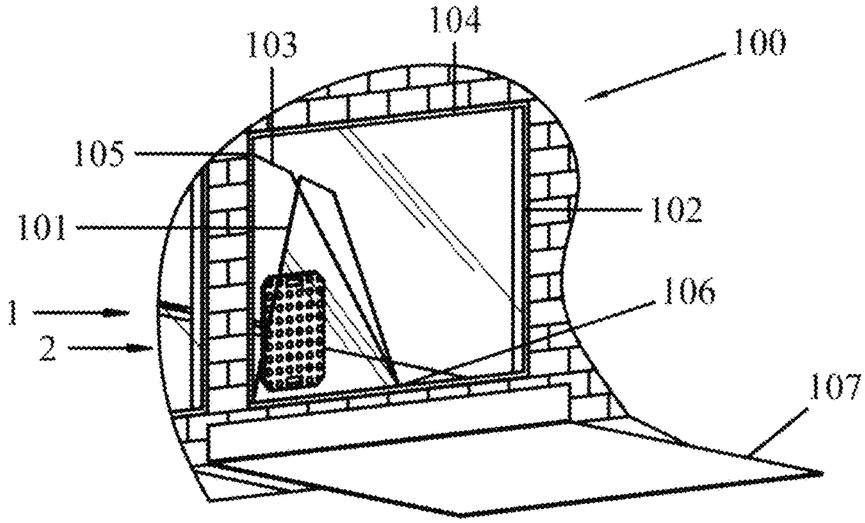
FIG. 12 is an exterior perspective view, partly broken, of the demolishing of glazing, as shown in FIG. 11, in accordance with the embodiment of the present invention, as shown in FIG. 1, further comprising moving the subpane to a position where the subpane can fall due to its weight, and allowing the subpane to fall due to its weight.
Figure 13:
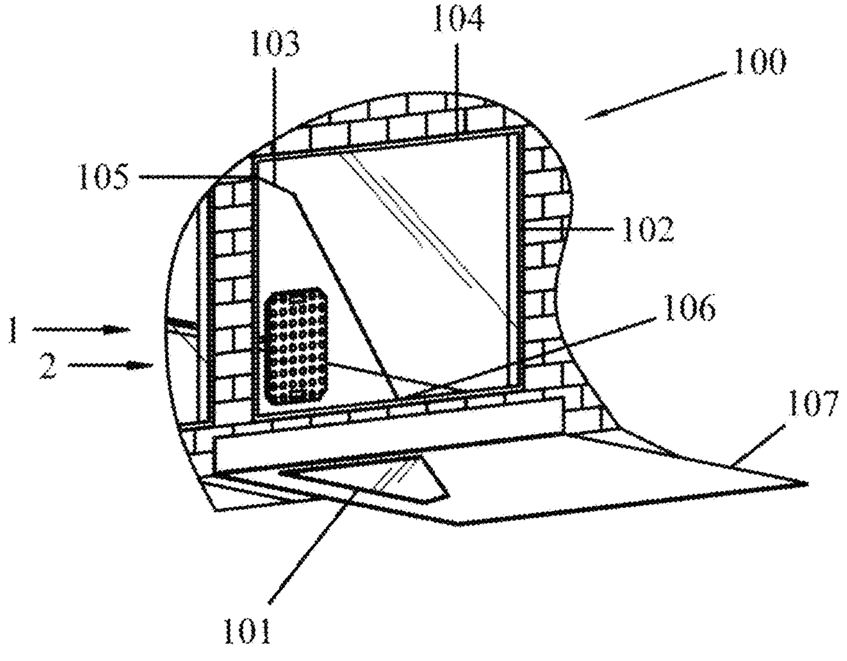
FIG. 13 is an exterior perspective view, partly broken, of the demolishing of glazing, as shown in FIG. 12, in accordance with the embodiment of the present invention, as shown in FIG. 1, further comprising catching the subpane as it falls with a receptacle comprising a mat.

FIGS. 11, 12, and 13 show the demolishing of glazing 100 that has at least one subpane, and specifically two subpanes 101 and 102 due to a crack 103 in the original pane of the glazing 100 dividing the original pane into the two subpanes 101 and 102 by extending between one point 105 on the perimeter edge 104 of the original pane to a different point 106 on the perimeter edge 104. The demolishing of the glazing 100 includes removing the subpanes 101 and 102 from the glazing 100. Preferably, the direction of removal is toward the exterior of the glazing 100, although removal toward the interior may also be done. Preliminary to the removing of the subpanes 101 and 102, any supporting trim, mould, seal, or caulk may be removed. As the demolishing shown in FIGS. 11, 12, and 13, is toward the exterior of the glazing 100, this would be done on only the ultimately outer surface of the original pane, and on only the next subpane to be removed.

A mat 107, as a receptacle, is placed to catch the subpanes, and in the embodiment as shown in FIGS. 11, 12, and 13, the subpanes 101 and 102, as they are removed from the glazing 100.

Next, the instability of each subpane is evaluated. The factors of instability include how loose that subpane is, how it responds to a light touch toward inclining it slightly out of the glazing, whether the framing is lessened in maintaining that subpane in the glazing, etc. Thus, the instability of each subpane is identified, and the subpanes have amongst themselves a range of instability, respectively from the least to the greatest. Therefore, one of the subpanes has the greatest instability. However, sometimes the instabilities are approximately equal; and may even be a null result, that is, approximately zero instability. Then in this case the subpane with the greatest instability is that subpane the removal of which would affect the other subpanes the least.

Further, the pusher 2 of the demolition ram 1 is selected for its size, either the residential glazing size or the large-scale glazing size. This is typically based upon the specific subpane to be removed. Therefore, at times the residential glazing size may be selected for the demolition of large-scale glazing, or the large-scale glazing size may be selected for the demolition of residential glazing, so as to better match the specific subpane that is next to be removed.

Then the handle 22 is selected for its size. More typically, the residential glazing size is almost always selected for demolishing common residential glazing, and the large-scale glazing size is almost always selected for demolishing large-scale glazing, although it may be vice versa as need be for the specific demolition.

Also, the pusher 2 or the handle 22, or both, of the demolition ram 1 for the size selected may be disassembled from the demolition ram 1 and a different size of the pusher 2 or the handle 22, or both, selected for reassembly of the demolition ram 1, or also connecting or disconnecting of the handle extension 33 to or from the handle 22, during the same demolition of the same glazing, so as to better match the specific subpane that is next to be removed.

Figure 7:
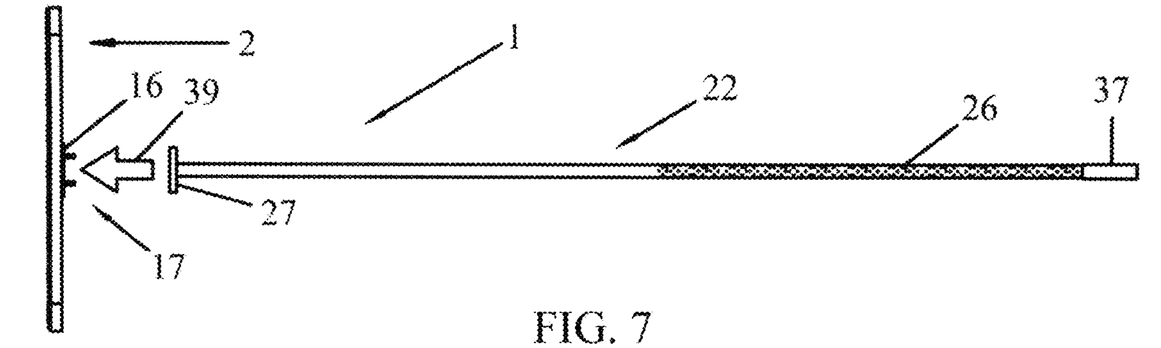
FIG. 7 is a side view of the embodiment of the present invention, as shown in FIG. 1, showing assembling of the pusher and the handle together.
Figure 8:
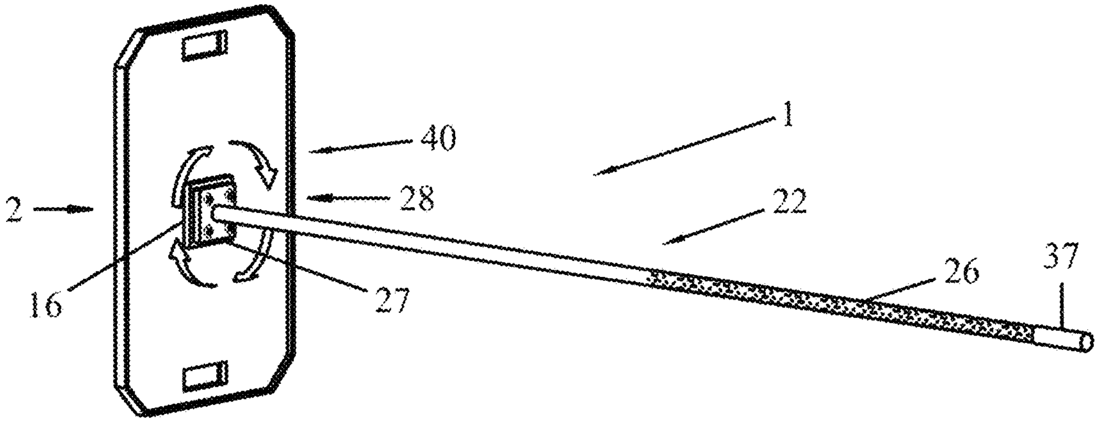
FIG. 8 is a perspective view of the embodiment of the present invention, as shown in FIG. 7, showing connecting of the pusher and the handle with fasteners.

Upon selecting the pusher 2 and the handle 22, the demolition ram 1 is assembled by aligning the apertures in the plate 27 with the fixed fasteners 17 on the boss 16. Assembling the handle 22 and the pusher 2 together is shown in FIG. 7, and is by moving 39 the handle 22 toward the pusher 2 until the plate 27 is adjacent to the boss 16. The removable fasteners 28 are then removably mounted onto the fixed fasteners 17, as by rotating 40 them as shown in FIG. 8, removably connecting the plate 27 of the handle 22 to the boss 16 of the pusher 2.

Figure 9:
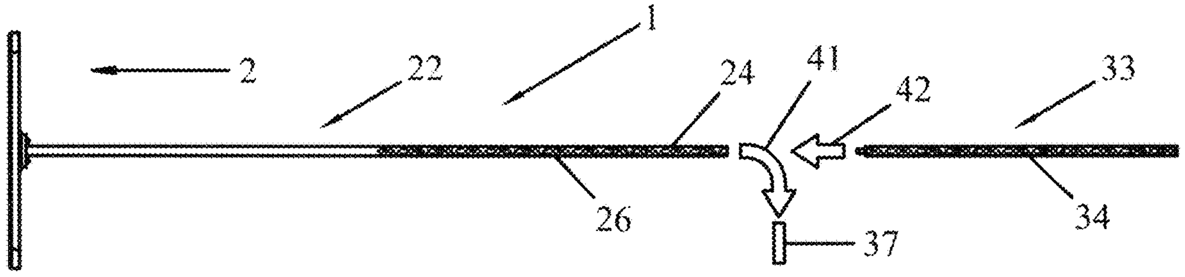
FIG. 9 is a side view of the embodiment of the present invention, as shown in FIG. 5 and FIG. 8, showing removing of an end cap, when mounted on the handle, from the handle before connecting of the handle extension to the handle.
Figure 10:
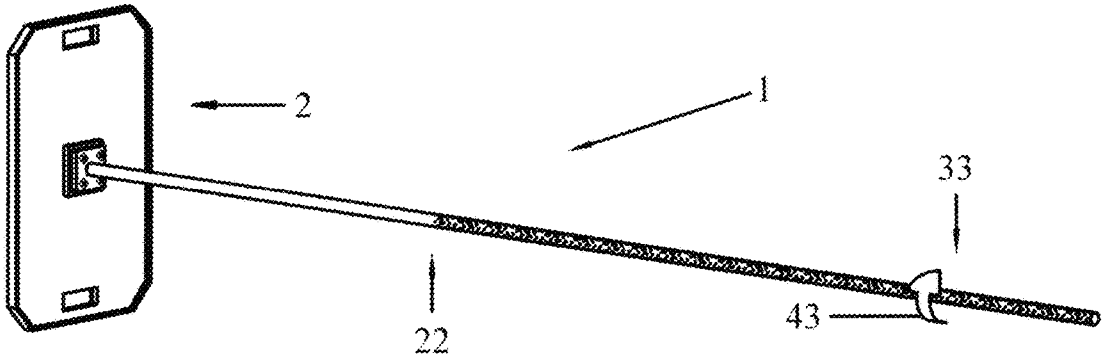
FIG. 10 is a perspective view of the embodiment of the present invention, as shown in FIG. 9, showing the connecting of the handle extension to the handle.

Optionally, and especially for the demolition of large-scale glazing, the handle extension 33 may be connected as shown in FIG. 9 to the handle 22 for greater distancing of those demolishing the glazing. The end cap 37 that is mounted on the proximal end 24 of the handle 22 is removed 41 from the handle 22. Then, the handle extension 33 is moved 42 toward the proximal end 24 of the handle 22. The pin 36 is inserted into the socket 35 for threadably connecting to each other, rotatably connecting 43 the handle extension 33 to the handle 22 as shown in FIG. 10.

Upon assembly of the demolition ram 1 and deployment, and for the embodiment of the present invention as shown in FIG. 11 within the interior with respect to the glazing 100, of the demolition ram 1, the demolishing commences. In the embodiment of the present invention as shown in FIG. 11, the subpane 101 has been identified as having the greatest instability, and thus is first to be removed from the glazing 100 by pushing the subpane 101 out of the glazing 100 with the demolition ram 1. The worker or workers demolishing the glazing 100 manipulate by hand the demolition ram 1 by handling the handle 22. Specifically, the textured surface 26 of the proximal end portion of the handle 22, and also the textured surface 34 of the handle extension 33 if the handle extension 33 is connected to the handle 22, provides a nonslip grip for firmly manipulating the handle 22 by hand. By manipulating the demolition ram 1 at the proximal end 24 or the handle extension 33, the worker or workers are spaced distantly far from the glazing, reducing the risk of serious or fatal injury during the demolition of the glazing 100.

As shown in FIG. 11, the demolition ram 1 is moved by the worker or workers so that the nonslip plating 6 of the pusher 2 is touching the subpane 101 at the ultimately inner surface of the subpane 101. The pushing of the subpane 101 out of the glazing 100 is by exerting 44 a force about the proximal end 24 of the handle 22, and also the handle extension 33 if the handle extension 33 is connected to the handle 22. The exerting 44 of that force generates an impulsive force 45 onto the subpane 101 through the touching of the subpane 101 with the nonslip plating 6 of the pusher 2. The impulsive force 45 is generally coaxial with the exerting 44 of the force about the proximal end 24 in that both the impulsive force 45 and the exerting 44 of the force about the proximal end 24 are generally aligned with and centered about the longitudinal axis of the handle 22. The impulsive force 45 is moderate, on the order of about 40 pounds (about 180 newtons of force), resulting in moving the subpane 101 to a position where the subpane 101 can fall due to its own weight.

Once moved to that position, as shown in FIG. 12, the subpane 101 continues to move both due to the inertia from the pushing and also due to the force of gravity. Allowing the subpane 101 to fall due to its weight, the subpane 101 collapses downward. FIG. 13 shows catching the falling subpane 101 with the mat 107. The subpane 101 is less likely to break upon impact with the mat 107; but even if the falling subpane 101 upon catching with the mat 107 does break, the newly broken subpanes of the subpane 101 are more likely to still be retained by the mat 107.

Once caught in the mat 107, the subpane 101 is broken up on the mat 107. The mat 107, with all of the fragments of the subpane 101, is then emptied (not shown), and preferably into a waste gondola, for safe disposal. Alternatively, another subpane or piece of the glazing can also be demolished by pushing it out of the glazing so that it can fall and be caught by the mat 107 before emptying the mat 107. The mat 107 is then replaced to continue to catch more of the glazing 100 that is being demolished.

Subsequently, each next subpane, and in the embodiment as shown in FIGS. 11, 12, and 13, the subpane 102, sequentially is also likewise removed from the glazing 100 by pushing that next subpane out of the glazing 100 with the demolition ram 1 until all or substantially all of the subpanes have been removed from the glazing. Nonetheless, any small fragments remaining in the glazing, for example still within any framing at the perimeter edge of the original pane, may be more easily and still safely removed conventionally.

After the mat 107 is no longer needed for the demolition of the glazing, the mat 107 can be put away for cleaning and storage for later reuse. The demolition ram 1 can also be disassembled for storage for later reuse.

Thus, the demolition ram 1 and the demolishing of glazing with the demolition ram 1 of the present invention can quickly demolish glazing yet reduce the risk of serious or fatal injury during that demolition of the glazing.

I claim:

1. A demolition ram comprising:

a pusher;

a handle connected to said pusher; and fasteners;

wherein said pusher comprises:

a support plate having a proximal surface, a distal surface, and a perimeter;

a boss on said proximal surface and having a perimeter; and a plating on said distal surface;

wherein:

said handle has a proximal end and a distal end;

said handle comprises a plate at said distal end; and said fasteners connect said plate of said handle to said boss; and wherein:

said plating is beveled defining a perimeter of said plating;

said plating has a larger base equal to said distal surface;

said perimeter of said boss is less than said perimeter of said support plate; and said perimeter of said plating is not more than said perimeter of said support plate.

* * * * *